March 29, 1932.　　　O. P. ARNESON　　　1,851,480

COURSING STARTING BOX

Filed Sept. 9, 1927　　2 Sheets-Sheet 1

INVENTOR
Otto P. Arneson.
By Ralph Karich
ATTORNEY

March 29, 1932.  O. P. ARNESON  1,851,480
COURSING STARTING BOX
Filed Sept. 9, 1927  2 Sheets-Sheet 2
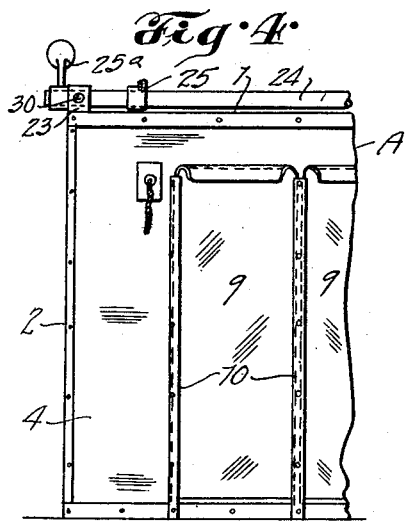
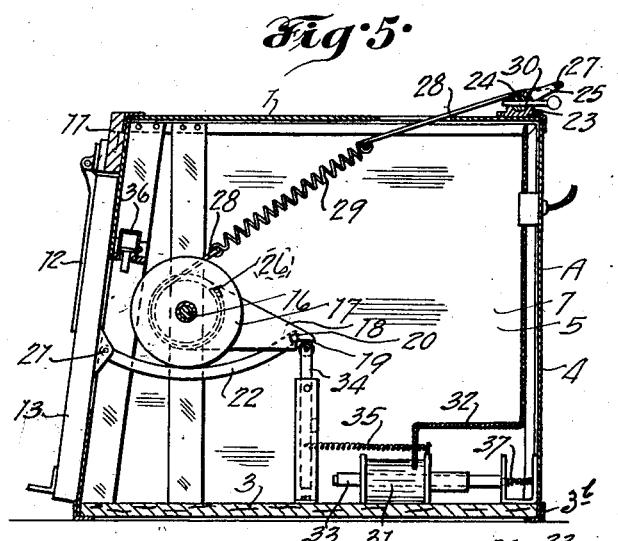
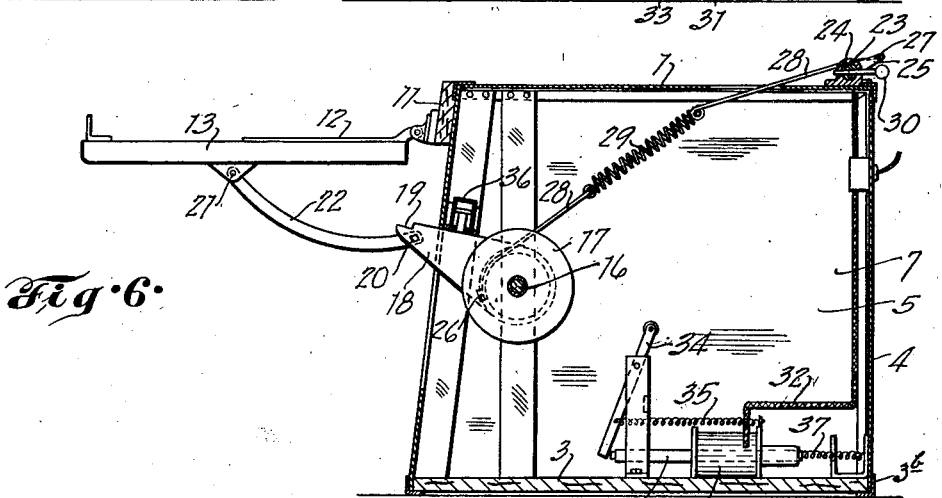
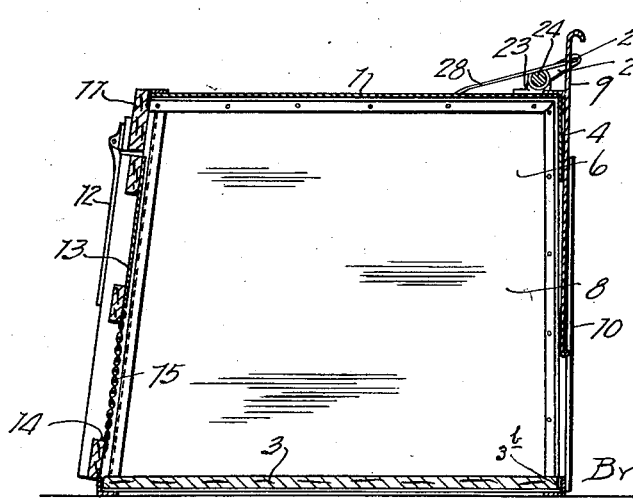
INVENTOR
Otto P. Arneson.
By
ATTORNEY Patented Mar. 29, 1932

1,851,480

UNITED STATES PATENT OFFICE

OTTO PETER ARNESON, OF RICHMOND HEIGHTS, MISSOURI, ASSIGNOR, BY DIRECT AND MESNE ASSIGNMENTS, OF ONE-HALF TO JAMES F. REDDING, OF RICHMOND HEIGHTS, MISSOURI

COURSING STARTING BOX

Application filed September 9, 1927. Serial No. 218,494.

This invention relates generally to coursing apparatus of the type especially in which an automotive artificial hare or other simulated game or lure is effectively utilized to excite and lead the hounds in the chase.

More particularly, my present invention relates to a certain new and useful improvement in starting-boxes for use in, and as part of, coursing apparatus of the type stated and has for its object the provision of such a starting-box so constructed and equipped as to effectively and at a precise or predetermined time in the travel of the lure release and free simultaneously the several hounds for the chase.

And with the above and other objects in view, my invention resides in the novel features of form, construction, arrangement, and combination of parts, hereinafter described and pointed out in the claims.

In the accompanying drawings,

Figure 4 is a fragmental rear elevational view of the box;

Figure 1:
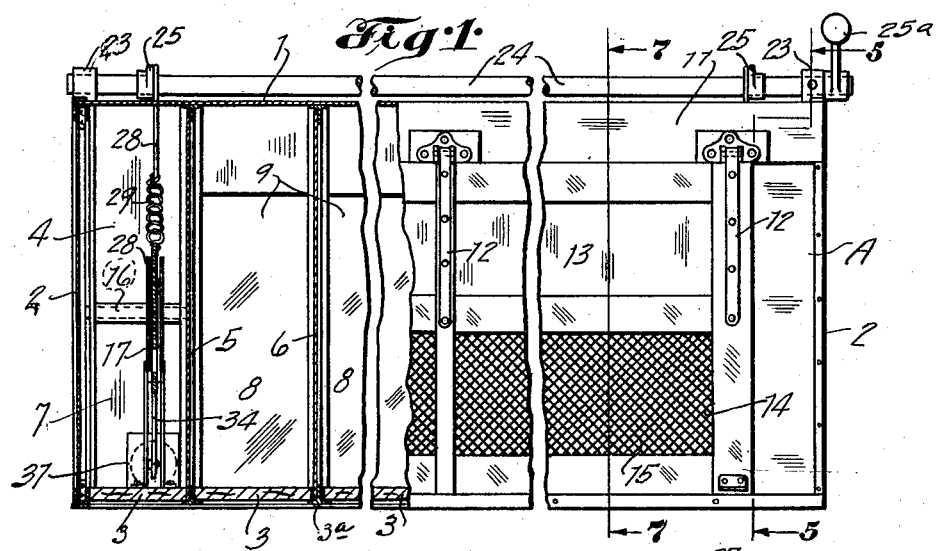
Figure 1 is a front elevational view, partly broken away and in section, of a coursing starting-box embodying my invention.
Figure 2:
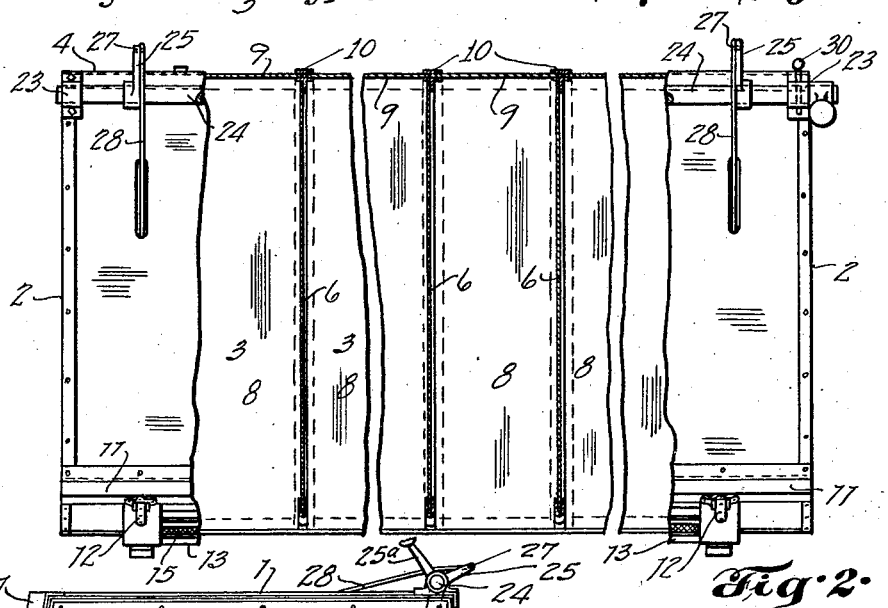
Figure 2 is a plan view, also partly broken away, of the box.

Figures 5 and 6 are vertical sectional views of the box taken approximately on the line 5—5, Figure 1, showing the front door of the box, respectively, in closed and open position; and Figure 7 is a vertical sectional view of the box taken approximately on the line 7—7, Figure 1.

Figure 3:
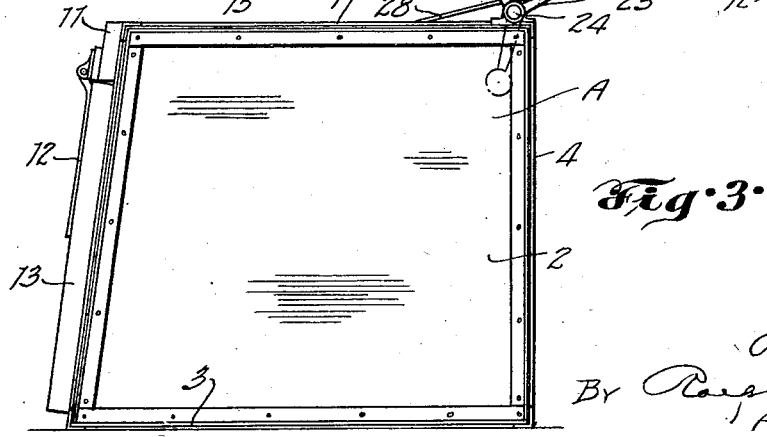
Figure 3 is an end view of the box.

Referring now more in detail and by reference characters to the drawings, which illustrate a preferred embodiment of my invention, the box A is preferably of general steel structure having the contour in end elevation best seen in Figure 3 and comprises a top-plate or wall 1, opposed end-plates or walls, 2, 2, and a rear plate or wall 4, all suitably flanged and riveted or otherwise rigidly secured together.

Internally, box A is divided by suitably spaced end-partitions 5 and intermediate partitions 6 to include opposite end-compartments 7, 7, and a plurality of intermediate stalls 8, the latter being usually eight in number. The end and rear walls 2 and 4 are preferably flanged inwardly at their lower margin, as shown, and fixed to the lower edge of each partition 5, 6, is a T-iron 3ª. Extending in the plane of the rear walls 4 from end wall to end wall, is a bottom rail 3ᵇ, which rails and flanges provide supports for preferably removable bottom walls 3 for the respective compartments 7 and stalls 8. At the rear of the box and substantially coincident with the several stalls 8, rear wall 4 is suitably cut away or otherwise provided with stall-entrance openings, which openings, upon the hounds being disposed within their respective stalls 8, are separately closable by means of gates or other suitable closures 9 movable vertically of the box in respective slide-ways 10 provided for the purpose upon the box rear wall 4, as best seen in Figures 4 and 7.

At its front and next its top, the box A includes a fixed strip or front wall portion 11, hinged to which at its upper end, as by strap-hinges or the like 12, is a single swingable door 13 forming the remainder of the front wall of the box and providing a front-end closure common to all of the several stalls 8. Preferably door 13 is formed with an elongated sight-opening, as at 14, for the several stalls 8, which opening is covered by a panel of open mesh wire fabric or other suitable material 15.

Suitably supported by the box end-walls 2 and the adjacent end-partitions 5 and disposed in axial alignment transversely of and within the end-compartments 7, are shafts 16, 16, and wholly disposed and housed within the compartments 7 and mounted for rotatory movement on the shafts 16, are suitable pulleys or drums 17, each provided upon an end face with a radially projecting rigid arm 18. Each arm 18 is formed at its outer or free end with a detent or recess 19, for purposes shortly appearing, and pivotally connected at one end, as at 20, to the free, outer end of each arm 18 and at its other or opposite end, as at 21, to the inner face of door 13, is a preferably arcuate link 22.

Mounted for rotation in suitable bearings 23 disposed at or adjacent the rear of the box A upon its top wall 1, is a shaft 24 preferably extending from end to end of the box, as best seen in Figures 1, 5, and 6, fixed rigidly to which shaft in co-operative location relatively to the end-compartments 7 and their housed pulleys or drums 17, are radially projecting arms 25, 25. Fastened at their opposite ends, as at 26, 27, to the respective pulleys or drums 17 and the arms 25, are flexible connections 28 lengthwise resiliently yielding or elastic in nature, as by means of interposed coiled springs 29. The shaft 24 is normally locked or retained against rotatory movement as by means of pins or the like 30 engaging the shaft 24 and its bearings 23, and I may here state that, when the shaft 24 is so locked, the arms 25 and the point of connection 26 between the connectors 28 and the drums or pulleys 17 are so relatively disposed and placed that normally pull is constantly exerted on the springs 29, such pull being increased and the springs 29 further extended when the door 13 is in closed position, as in Figure 5. Thus the connectors 28 are adapted to function both to rotatorily actuate the drums 17 to effect opening of the door 13, as shortly more fully appears, and to yieldingly subsequently assist in retaining the door 13 in its open position, or in the position thereof illustrated in Figure 6. By disengaging the pins 30, the shaft 25 may be rotatorily moved, as by means of arms 25ª, to reduce the pull of the connectors 28 upon the door 13, so as to facilitate convenient swinging of the door 13 to closed position.

Disposed within each of the compartments 7, is a solenoid 31 included by means of suitable conductors 32 in a normally open electric circuit adapted for closing at a suitable point, distant or near, as may be desired in the particular course, and by suitable means, as in a co-pending application filed July 20, 1927, Serial No. 207,308, fully and in detail explained and described. Co-operable with the solenoids 31, are plunger-armatures 33, and suitably mounted for swingable movement within the compartments 7 and engageable with the drum-arms 18 and engageable by the plunger-armatures 33, are tiltable bars 34 yieldingly retained in normal upright arm-engaging position as by means of coiled springs 35 suitably attached thereto and to the solenoid-frames, as best seen in Figures 5 and 6.

In use and operation, the several parts are so proportioned and relatively arranged that, when the door 13 is in downwardly swung or closed position, as in Figure 5, the bars 34 will engage at their upper ends with the drum-arms 18 at their free-end recesses 19, the door 13 being thereby releasably held or retained in closed position under the constant pull of the elastic connectors 28. On the solenoid circuit being closed, the solenoids 31 are energized and the plungers 33 actuated to tilt the bars 34 against the pull of the springs 35, the bars 34 being thereby disengaged from the pulley-arms 18. Thereupon the door 13 suddenly and quickly, under the pull of the resilient connectors 28, swingably moves to open position, as shown in Figure 6, and thus releases or frees the several hounds for the chase. To cushion the door 13 upon such opening movement, dashpots or the like 36 are suitably provided upon the box, as best shown in Figures 5 and 6, and preferably the plungers 33 are spring-pulled, as at 37, to facilitate their return to normal position on subsequent opening of the solenoid circuit.

It will be noted that when the door 13 is in open position, the pivot-points 20 are out of alignment with, and to one side of a line extending between, the pivot points 21 and the shafts 16, whereby the door 13 is substantially rigidly retained by means of the arms 18 and links 22 in upwardly swung or fully open position and cannot be actuated or swung to closed position until the door 13 is positively manipulated to permit the pivot-points 20 to drop below the line of the pivot-points 21 and the shafts 16.

I am aware that changes in the form, construction, arrangement, and combination of the several parts of my new starting-box may be made and substituted for those herein shown and described without departing from the nature and principle of my invention.

Having thus described my invention, what I claim and desire to secure by Letters Patent is:

1. In a coursing apparatus, a starting-box having an opening, a door swingably mounted on the box for closing said opening, a drum mounted upon the box for rotatory movement, a rigid radial arm fixed at an end on the drum, a link having pivoted connection at an end with the door and at its opposite end with the free end of the arm, means upon the box adapted for releasable engagement with the free end of the arm for retaining the drum and its arm against movement and the door in closed position, and means including a flexible member having pulling connection at an end with and windable upon the drum for automatically rotatorily moving the drum and thereby oscillatorily actuating said arm to open the door on disengagement of said first means with the arm.

2. In a coursing apparatus, a starting-box having an opening, a door swingably mounted on the box for closing said opening, a drum mounted upon the box for rotatory movement, a rigid radial arm fixed at an end on the drum, a link having pivoted connection at one end with the door and at its opposite end with the free end of the arm, elastically yielding means on the box having pulling engagement with the drum for rotarily actuating the drum and its said arm in one direction for opening the door, means upon the box adapted, when the door is closed, for releasable engagement with the free end of the arm for retaining the drum, under the pull of said yielding means, against movement and the door in closed position, and means for effecting disengagement of said retaining means with said arm, rotary movement of the drum to door-closing position increasing the door actuating pull of said yielding means.

In testimony whereof, I have signed my name to this specification.

OTTO PETER ARNESON.